UNITED STATES PATENT OFFICE.

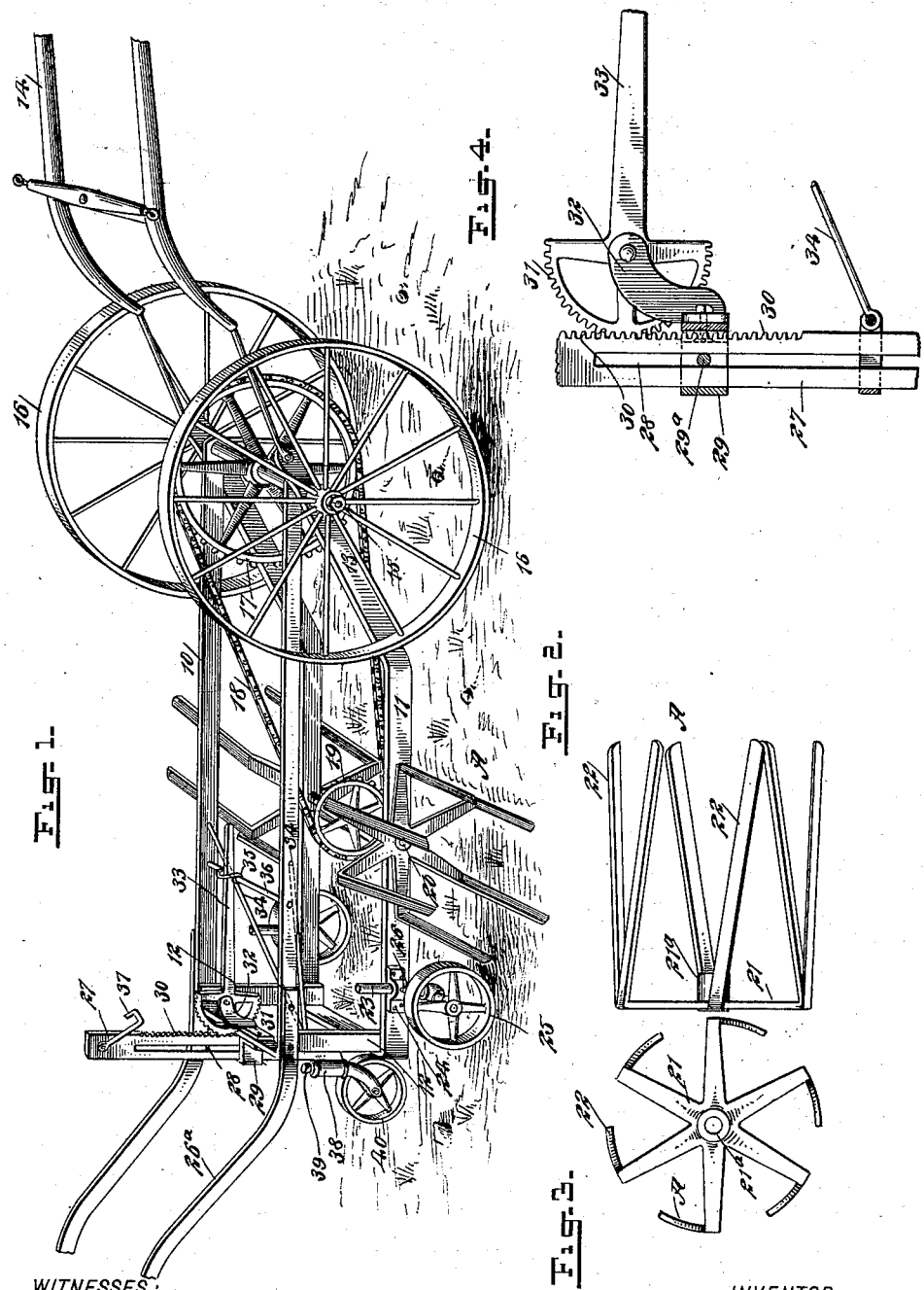

JULIUS HEINRICH LUHRS, OF FRUITA, COLORADO.

MACHINE FOR TOPPING BEETS.

SPECIFICATION forming part of Letters Patent No. 664,420, dated December 25, 1900.

Application filed January 4, 1900. Serial No. 357. (No model.)

*To all whom it may concern:*

Be it known that I, JULIUS HEINRICH LUHRS, a citizen of the United States, residing at Fruita, in the county of Mesa and State of Colorado, have invented a new and Improved Machine for Topping Beets, of which the following is a full, clear, and exact description.

One object of my invention is to provide a machine especially adapted for topping beets in the field and which can be drawn between rows of beets and will operate simultaneously on the tops of two rows.

A further object of the invention is to so construct the cutters that they will cleanly sever the tops and likewise provide means for regulating the distance between the cutting-blades and the ground.

A further object of the invention is to construct a light, simple, and durable machine of the character described which may be raised readily at the front in a manner to carry the cutters some distance from the ground and enable the machine to be carried to and from the field without injury to said cutters.

The invention consists in the novel construction and combination of the several parts, as will be hereinafter fully set forth, and pointed out in the claim.

Reference is to be had to the accompanying drawings, forming a part of this specification, in which similar characters of reference indicate corresponding parts in all the figures.

Figure 1 is a perspective view of the improved machine. Fig. 2 is a side elevation of one of the cutters. Fig. 3 is an end view of one of the cutters, and Fig. 4 is a sectional view taken vertically at the rear portion of the frame and illustrating the adjusting mechanism for the rear of the frame.

The frame of the machine comprises an upper skeleton section 10 and a lower skeleton section 11, the upper frame-section being rectangular and the lower frame-section rectangular at the rear, at which point the two frame-sections are connected by uprights 12, while the two frame-sections 10 and 11 are connected at the front by inclined portions 13 of the side bars of the lower frame-section, being carried upward to meet the forward end of the upper frame-section. The shafts 14 are connected in any suitable manner with the forward portion of the frame. An axle 15 is journaled in the forward portion of the frame, and supporting-wheels 16 are secured on the said axle. A large sprocket-wheel 17 is also secured on the axle, and a chain or other form of belt 18 is carried from the sprocket-wheel over a small sprocket-wheel 19, secured to a shaft 20, which is journaled in the lower portion of the frame between the center and the rear of the same. This shaft 20 is adapted to carry at each of its ends a cutter A, and the cutters extend horizontally in opposite directions beyond the sides of the frame. Each cutter, as shown particularly in Figs. 2 and 3, consists of a spider-body 21 and blades 22, which are at a right angle to the spider-arms 21 and are arranged in a horizontal plane, one longitudinal edge of each blade being a cutting edge. If desired, however, the blades 22 may be laterally inclined to a greater or less extent. Thus it will be observed that as the shaft 20 is revolved the blades 22 will strike the tops of the beets quite close to the ground and will sever them, and the distance between the blades is preferably such that as the machine is advanced when one blade has ceased operating on the beets of a row the next succeeding blade of the same cutter will be in position to act upon the next plant. The frame is raised and lowered so that the cutters A will cut the tops of the beets more or less closely to the upper surfaces of the beet-roots by means of angle stub-axles 23, mounted to slide in bearings 24 at each side of the lower portion of the frame near the rear, and these axles are held in adjusted position by set-screws 26 or their equivalents. Each of the axles 23 carries a small wheel 25 slightly at the rear of the cutters A.

The rear of the frame is raised and lowered to bring the cutters into action or to carry them out of possible engagement with the beet-root tops by means of an adjusting mechanism. (Shown in detail in Fig. 4.) This adjusting mechanism consists of a bar 27, having a longitudinal slot 28, the bar being held to slide in a guide 29, secured to the upper section 10 of the frame at the rear, a pin $29^a$ being passed through the guide and through the slot 28. The bar 27 is provided with teeth 30 in its forward edge, and these teeth are adapted to engage with a mutilated gear 31, pivoted in hangers 32, attached to the upper frame-section 10, and said mutilated gear is provided with a handle 33, whereby it may be conveniently manipulated to raise and lower the rack-bar. This rack-bar is pivotally connected at its lower portion with the frame of the machine by suitable rods 34, and the handle 33 of the mutilated gear 31, which is practically a segmental lever, is held in a horizontal or lower position by a hook 35, engaging with the handle, the hook being carried by a cross-bar 36 of the frame, while an upper hook 37, attached to the upper portion of the rack-bar 27, is arranged to hold the handle of the segmental lever in its upper position. A bearing 38 is located upon the rear lower portion of the rack-bar 27, and the spindle 39 of a caster-wheel 40 is swiveled in the said bearing 38 or is mounted to turn therein in any needed direction. Handles 26ª are provided at the rear of the machine, being usually a continuation of or attached to the upper member of the frame.

Having thus described my invention, I claim as new and desire to secure by Letters Patent—

A machine for topping beets and other plants, the machine comprising a frame, a wheeled axle mounted therein at one end thereof, carrying wheels for the opposite end thereof, a sprocket-wheel attached to the said wheeled axle, approximately at the longitudinal center of the machine, a cutter-shaft mounted transversely in the frame and projecting beyond the sides thereof, a sprocket-wheel attached to the cutter-shaft, a chain running between the sprocket-wheels to drive the cutter-shaft, and cutters attached to the respective ends of the cutter-shaft outside the frame, the cutters each comprising a spider-like body having blades extended outward from the arms thereof approximately at right angles thereto so as to lie in the plane of the ground.

In testimony whereof I have signed my name to this specification in the presence of two subscribing witnesses.

JULIUS HEINRICH LUHRS.

Witnesses:
SQUIRE G. LANE,
M. F. SKELLY.